US012283774B2

(12) United States Patent
Saito et al.

(10) Patent No.: US 12,283,774 B2
(45) Date of Patent: Apr. 22, 2025

(54) CONNECTOR

(71) Applicant: SUMITOMO WIRING SYSTEMS, LTD., Mie (JP)

(72) Inventors: Sho Saito, Mie (JP); Yuma Mamiya, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 355 days.

(21) Appl. No.: 17/794,385

(22) PCT Filed: Jan. 15, 2021

(86) PCT No.: PCT/JP2021/001171
§ 371 (c)(1),
(2) Date: Jul. 21, 2022

(87) PCT Pub. No.: WO2021/157319
PCT Pub. Date: Aug. 12, 2021

(65) Prior Publication Data
US 2023/0050099 A1 Feb. 16, 2023

(30) Foreign Application Priority Data
Feb. 5, 2020 (JP) ................................ 2020-017759

(51) Int. Cl.
*H01R 13/631* (2006.01)
*H01R 13/42* (2006.01)
(Continued)

(52) U.S. Cl.
CPC ........... *H01R 13/631* (2013.01); *H01R 13/42* (2013.01); *H01R 13/516* (2013.01); *H01R 13/5202* (2013.01); *H01R 13/64* (2013.01)

(58) Field of Classification Search
CPC .... H01R 13/631; H01R 13/42; H01R 13/516; H01R 13/5202; H01R 13/64
(Continued)

(56) References Cited

U.S. PATENT DOCUMENTS 5,116,236 A * 5/1992 Colleran ............ H01R 13/4362 439/271
5,782,658 A * 7/1998 Maegawa .......... H01R 13/5219 439/271
(Continued)

FOREIGN PATENT DOCUMENTS

CN 207265295 U 4/2018
JP 2006-172754 A 6/2006
JP 2016-131133 A 7/2016

OTHER PUBLICATIONS

International Search Report issued on Mar. 30, 2021 for WO 2021/157319 A1 (4 pages).

*Primary Examiner* — Gary F Paumen
(74) *Attorney, Agent, or Firm* — Venjuris, P.C.

(57) ABSTRACT

It is aimed to avoid making a movable arm portion difficult to deflect. A connector is provided with a male housing (10) connectable to a female housing (40), a sealing ring (15) to be mounted on an inner peripheral surface of the male housing (10) for sealing between the inner peripheral surface of the male housing (10) and an outer peripheral surface of the female housing (40), resiliently deformable movable arm portions (30) formed on the male housing (40), and stoppers (37) for restricting a movement of the sealing ring (15). The movable arm portion (30) includes a fulcrum portion (31) and a displacing portion (32) extending from the fulcrum portion (31) and displaceable in a direction intersecting an extending direction. The stopper (37) projects from the displacing portion (32).

5 Claims, 5 Drawing Sheets

(51) Int. Cl.
*H01R 13/516* (2006.01)
*H01R 13/52* (2006.01)
*H01R 13/64* (2006.01)

(58) Field of Classification Search
USPC .................................................. 439/248, 271
See application file for complete search history.

(56) References Cited

U.S. PATENT DOCUMENTS

| | | | | |
|---|---|---|---|---|
| 6,793,513 | B2 * | 9/2004 | Shibata .............. | H01R 13/6272 439/271 |
| 7,059,901 | B2 * | 6/2006 | Morita ............... | H01R 13/5219 439/271 |
| 7,097,493 | B1 * | 8/2006 | Roth .................... | H01R 12/727 439/409 |

* cited by examiner

CONNECTOR

CROSS REFERENCE TO RELATED APPLICATIONS

This application is a national phase of PCT application No. PCT/JP2021/001171, filed on 15 Jan. 2021, which claims priority from Japanese patent application No. 2020-017759, filed on 5 Feb. 2020, all of which are incorporated herein by reference.

TECHNICAL FIELD

The present disclosure relates to a connector.

BACKGROUND

Patent Document 1 discloses a connector in which a receptacle of a connector housing is formed with a lock arm and a connected state to a mating connector is maintained by the lock arm. A sealing ring is provided on an inner wall surface of the receptacle and retained by a retaining surface formed on a rear end part of the lock arm.

PRIOR ART DOCUMENT

Patent Document

Patent Document 1: JP 2016-131133 A

SUMMARY OF THE INVENTION

Problems to be Solved

The retaining surface formed on the rear end part of the lock arm projects in a stepped manner from the inner wall surface of the receptacle. Accordingly, a radial dimension of a region of the receptacle where the retaining surface is formed, i.e. the rear end part of the lock arm, is increased by as much as the formed retaining surface. Since the rear end part of the lock arm is a part serving as a deflection fulcrum of the lock arm, the rigidity of the deflection fulcrum of the lock arm is enhanced by forming the retaining surface and it becomes difficult to resiliently deform the lock arm. Thus, friction resistance increases when the mating connector fit into the receptacle comes into contact with the lock arm and resiliently deforms the lock arm.

A connector of the present disclosure was completed on the basis of the above situation and aims to avoid making a movable arm portion difficult to deflect.

Means to Solve the Problem

The present disclosure is directed to a connector with a connector housing connectable to a mating housing, a sealing ring to be mounted on a peripheral surface of the connector housing for sealing between the peripheral surface of the connector housing and a peripheral surface of the mating housing, a resiliently deformable movable arm portion formed on the connector housing, and a stopper for restricting a movement of the sealing ring, the movable arm portion including a fulcrum portion and a displacing portion extending from the fulcrum portion and displaceable in a direction intersecting an extending direction, and the stopper projecting from the displacing portion.

Effect of the Invention

According to the present disclosure, it is possible to avoid making a movable arm portion difficult to deflect.

DETAILED DESCRIPTION TO EXECUTE THE INVENTION

Description of Embodiments of Present Disclosure

Figure 1:
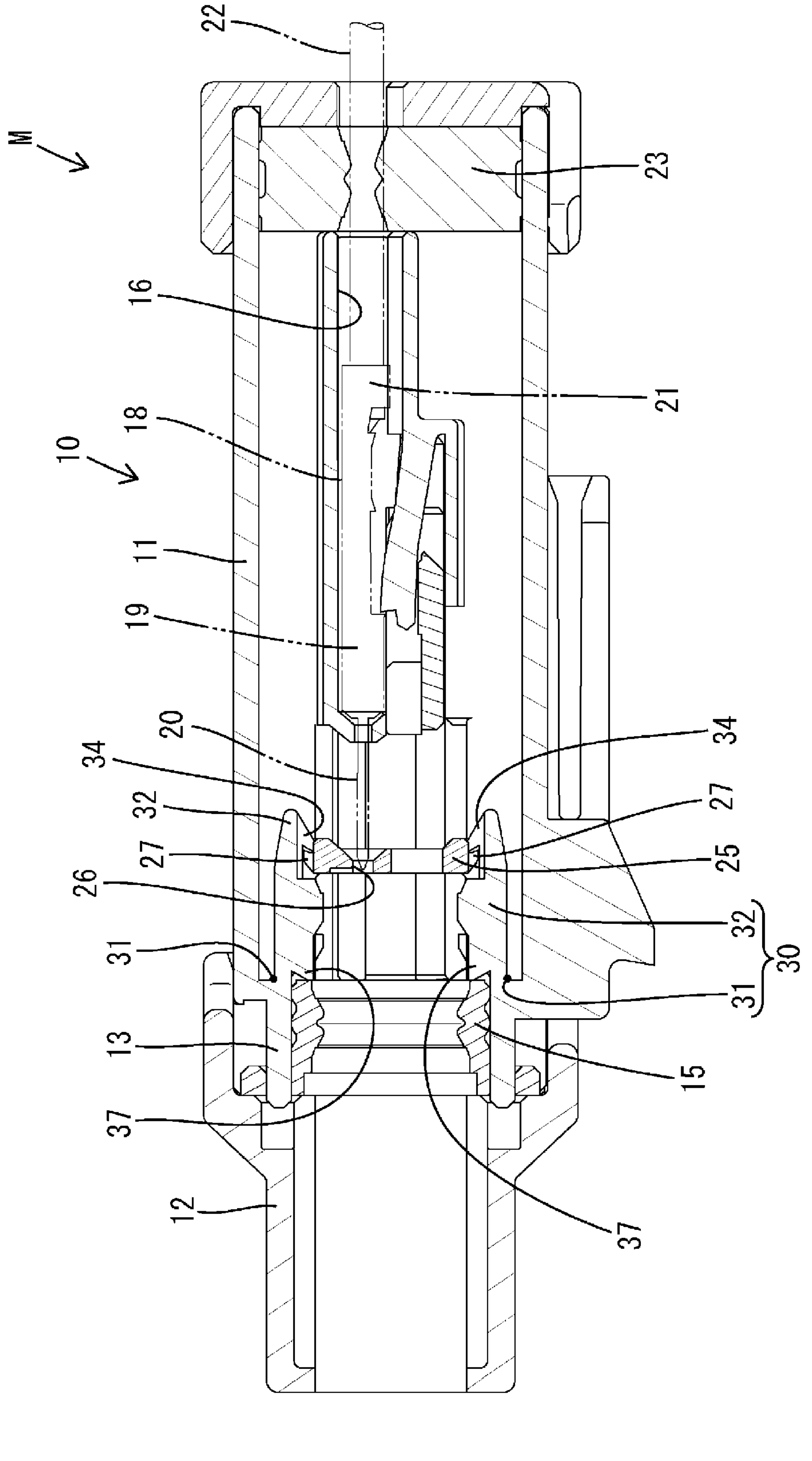
FIG. 1 is a side view in section of a connector of an embodiment.

First, embodiments of the present disclosure are listed and described.

(1) The connector of the present disclosure is provided with a connector housing connectable to a mating housing, a sealing ring to be mounted on a peripheral surface of the connector housing for sealing between the peripheral surface of the connector housing and a peripheral surface of the mating housing, a resiliently deformable movable arm portion formed on the connector housing, and a stopper for restricting a movement of the sealing ring, the movable arm portion including a fulcrum portion and a displacing portion extending from the fulcrum portion and displaceable in a direction intersecting an extending direction, and the stopper projecting from the displacing portion. If the stopper projects from the fulcrum portion of the movable arm portion as in Patent Document 1, the fulcrum portion becomes thick and the rigidity of the fulcrum portion is enhanced. Thus, the movable arm portion is less likely to be deflected. In contrast, since the stopper of the present disclosure is formed only on the displacing portion of the movable arm portion, the fulcrum portion can be thinned and the rigidity of the fulcrum portion can be suppressed low. In this way, it can be avoided to make the movable arm portion difficult to deflect.

(2) Preferably, the stopper is formed only in a region of the displacing portion separated from the fulcrum portion. According to this configuration, an increase in rigidity due to the formation of the stopper is unlikely to affect the fulcrum portion.

(3) Preferably, in (2), the stopper is disposed at a distance from the fulcrum portion in the extending direction of the displacing portion. According to this configuration, an increase in rigidity due to the formation of the stopper is unlikely to affect the fulcrum portion.

(4) Preferably, in (3), a facing surface of the stopper facing the sealing ring is inclined to approach the sealing ring in a projecting direction of the stopper. According to this configuration, when the sealing ring is pressed against the facing surface of the stopper, the sealing ring enters and bites into a space defined by the displacing portion and the facing surface. Since the sealing ring is made difficult to separate from the peripheral surface of the connector housing in this way, sealing performance is excellent.

(5) Preferably, in (4), a displacement direction of the displacing portion when the movable arm portion is resiliently deformed from a free state where the movable arm portion is not resiliently deformed is a direction to move the facing surface away from the sealing ring. According to this configuration, the stopper can be prevented from biting into the sealing ring when the movable arm portion is resiliently deformed.

(6) Preferably, a positioning member movable between a first position for positioning a tip part of a tab of a male terminal fitting and a second position for positioning a base end part of the tab is mounted in the connector housing, the movable arm portion is capable of holding the positioning member at the first position, and the mating housing resiliently deforms and disengages the movable arm portion from the positioning member in a connection process of the mating housing. According to this configuration, a connection force required to resiliently deform the movable arm portion in the connection process of the mating housing can be reduced.

Details of Embodiment of Present Disclosure

Embodiment

Figure 2:
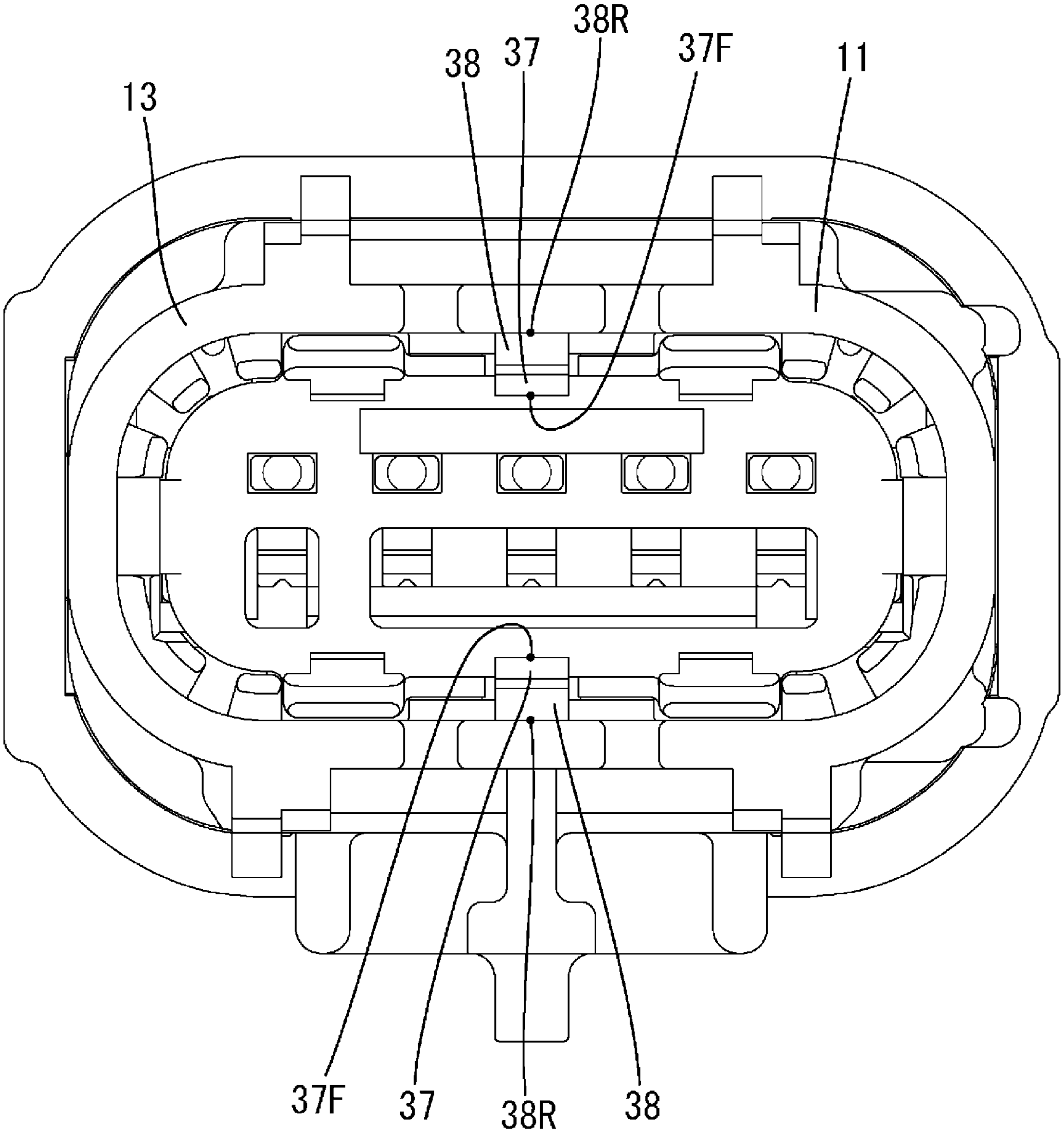
FIG. 2 is a front view showing a state where a front member and a sealing ring are removed from a housing body.
Figure 3:
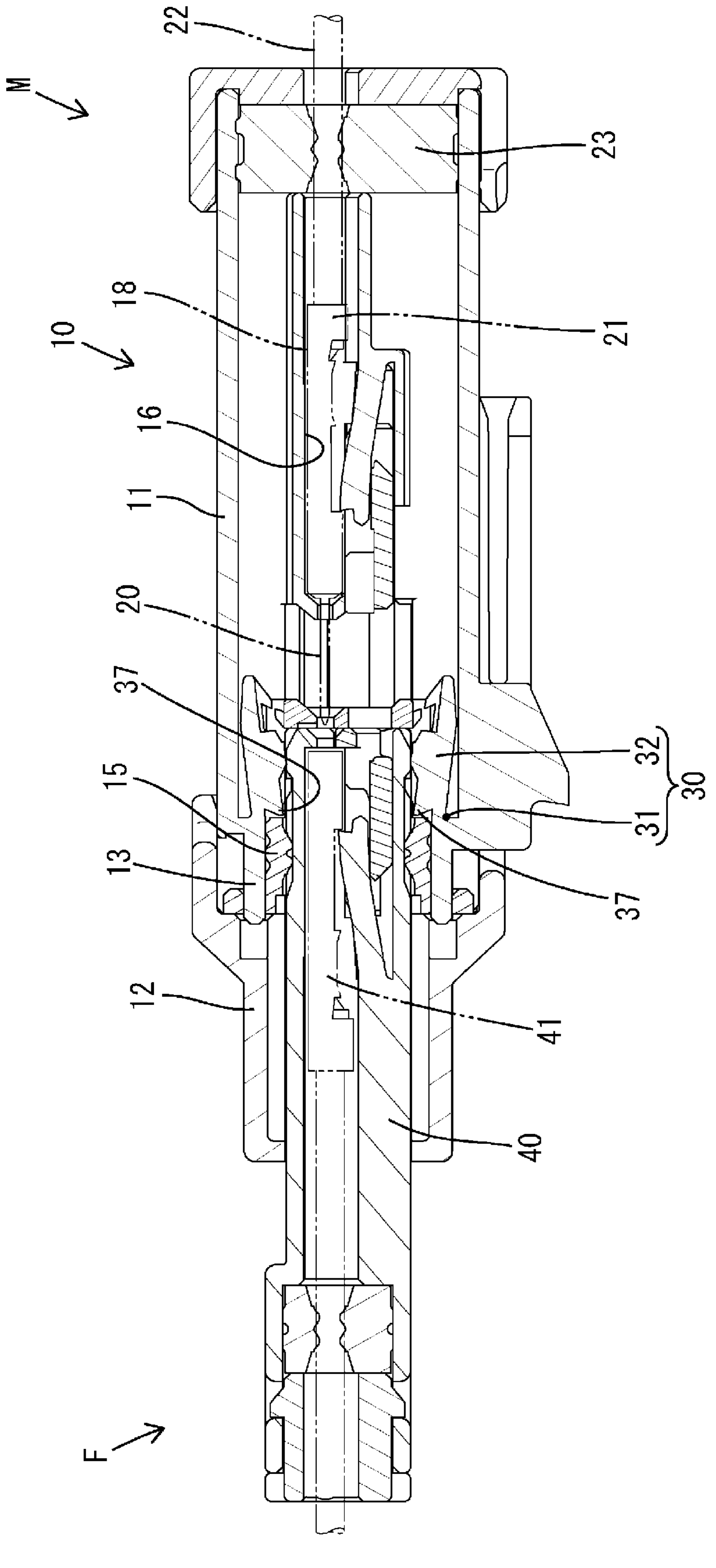
FIG. 3 is a side view in section showing a state where movable arm portions are resiliently deformed.

A specific embodiment of a connector of the present disclosure is described below with reference to FIGS. 1 to 5. Note that the present invention is not limited to these illustrations and is intended to be represented by claims and include all changes in the scope of claims and in the meaning and scope of equivalents. A connector of this embodiment includes a female connector F and a male connector M as shown in FIGS. 3 and 5. In the female connector F, a plurality of female terminal fittings 41 are accommodated in a female housing 40.

In this embodiment, a left side in FIGS. 1 and 3 to 5 is defined as a front side concerning a front-rear direction of the male connector M. Upper and lower sides shown in FIGS. 1 to 5 are directly defined as upper and lower sides concerning a vertical direction. Left and right sides shown in FIG. 2 are directly defined as left and right sides concerning a lateral direction.

The male connector M includes a male housing 10, male terminal fittings 18, a one-piece rubber plug 23 and a positioning member 25. The male housing 10 includes a housing body 11 made of synthetic resin and a front member 12 in the form of a receptacle assembled with a front end part of the housing body 11. A tubular sealing portion 13 continuous over an entire periphery is formed in the front end part of the housing body 11. As shown in FIG. 2, the sealing portion 13 has a rectangular shape long in the lateral direction as a whole, in particular, has a rectangular shape with four quarter-circular corners, in a front view of the housing body 11.

As shown in FIG. 1, a sealing ring 15 is mounted on the inner peripheral surface of the sealing portion 13. The sealing ring 15 is inserted into the sealing portion 13 from front of the housing body 11. A dimension in the front-rear direction of the sealing ring 15 is larger than a dimension in a radial direction (thickness direction) of the sealing ring 15. The sealing ring 15 seals between the inner peripheral surface of the housing body 11 and the outer peripheral surface of the female housing 40 in a liquid-tight manner.

A plurality of cavities 16 are formed at intervals in the lateral direction in the housing body 11. The cavities 16 are arranged behind the sealing portion 13. The male terminal fitting 18 is inserted into each cavity 16 from behind the housing body 11. The male terminal fitting 18 has a shape elongated in the front-rear direction as a whole. The male terminal fitting 18 includes a terminal body portion 19 in the form of a rectangular tube, a tab 20 projecting forward from the terminal body portion 19 and a crimping portion 21 in the form of an open barrel connected to a rear end part of the terminal body portion 19. A front end part of a wire 22 is fixed to the crimping portion 21. The wire 22 is drawn out rearward from the male housing 10 through the one-piece rubber plug 23 mounted in a rear end part of the housing body 11.

The positioning member 25 is accommodated in the housing body 11. The positioning member 25 is movable between a first position (see FIGS. 1, 3 and 4) and a second position (see FIG. 5) rearward of the first position in front of the cavities 16. The positioning member 25 is formed with a plurality of positioning holes 26, through which a plurality of the tabs 20 are individually passed. With the positioning member 25 located at the first position, tip parts (front end parts) of the tabs 20 are positioned by the positioning holes 26. With the positioning member 25 located at the second position, base end parts (rear end parts) of the tabs 20 are positioned by the positioning holes 26. A pair of projections 27 are formed on both upper and lower end edge parts of the positioning member 25.

The housing body 11 is formed with a pair of vertically symmetrical movable arm portions 30 cantilevered rearward from a rear end part of the sealing portion 13. The pair of movable arm portions 30 are arranged in laterally central parts of upper and lower wall parts constituting the sealing portion 13. In the front-rear direction, the movable arm portions 30 are arranged in a region behind the sealing portion 13 and the sealing ring 15 and in front of the cavities 16.

The movable arm portion 30 includes a fulcrum portion 31 connected to the rear end of the sealing portion 13 and a displacing portion 32 cantilevered rearward from the fulcrum portion 31. The fulcrum portion 31 is located on an outer peripheral surface part of the rear end of the sealing portion 13. The displacing portion 32 is normally held at a locking position (see FIGS. 1 and 5) to extend in the front-rear direction (direction parallel to a connecting direction of the female connector F to the male connector M). The movable arm portion 30 is resiliently deformable to displace the displacing portion 32 to an unlocking position (see FIGS. 3 and 4) radially outward (upward in the upper movable arm portion 30 in FIGS. 1, 3 and 4) of the locking position. When the displacing portion 32 is displaced to the unlocking position, the displacing portion 32 is obliquely inclined toward an outer surface side (upper surface side in the upper movable arm portion 30 in FIGS. 1, 3 and 4) of the movable arm portion 30 with the fulcrum portion 31 as a center.

Figure 4:
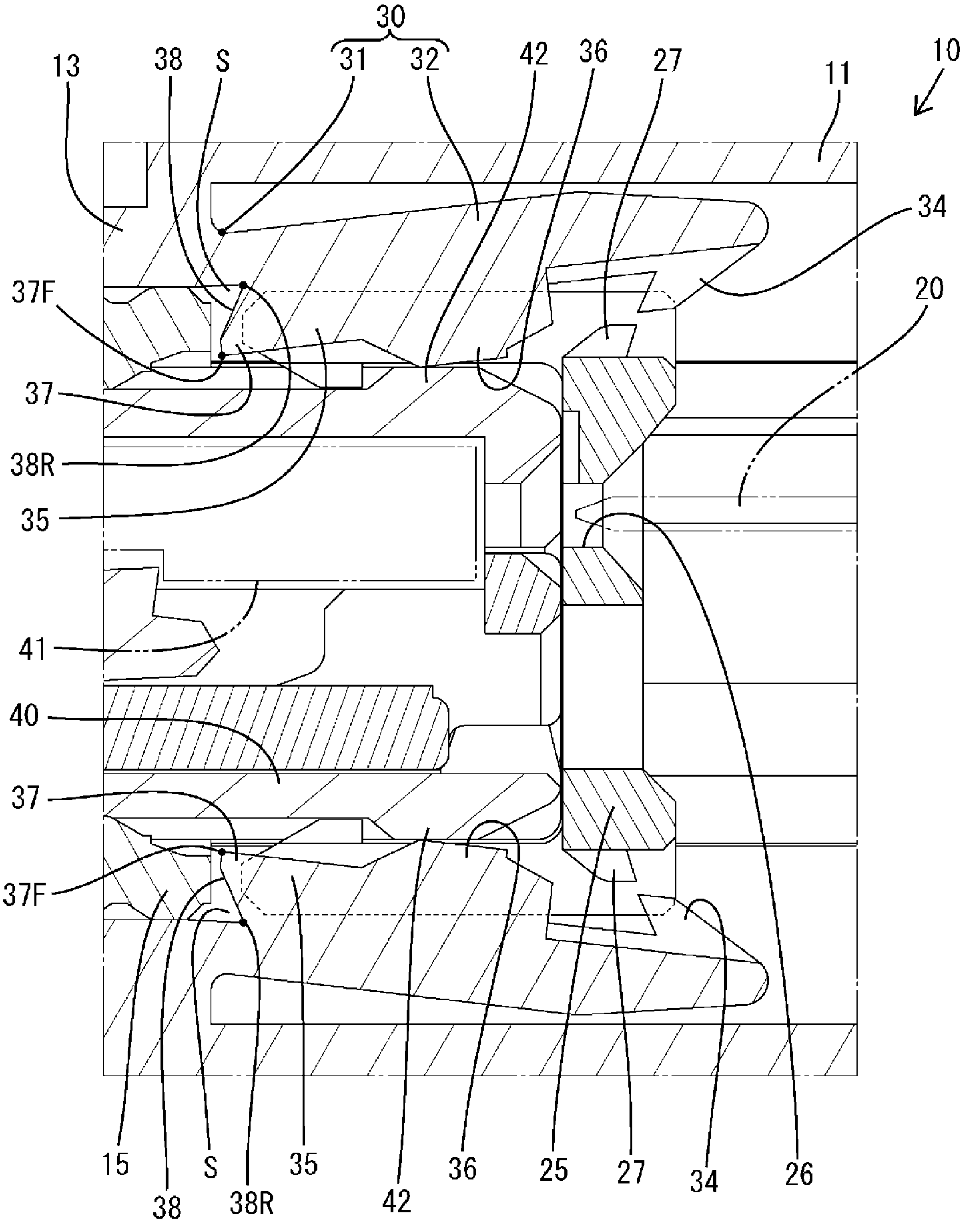
FIG. 4 is a side view in section enlargedly showing a part of FIG. 3.
Figure 5:
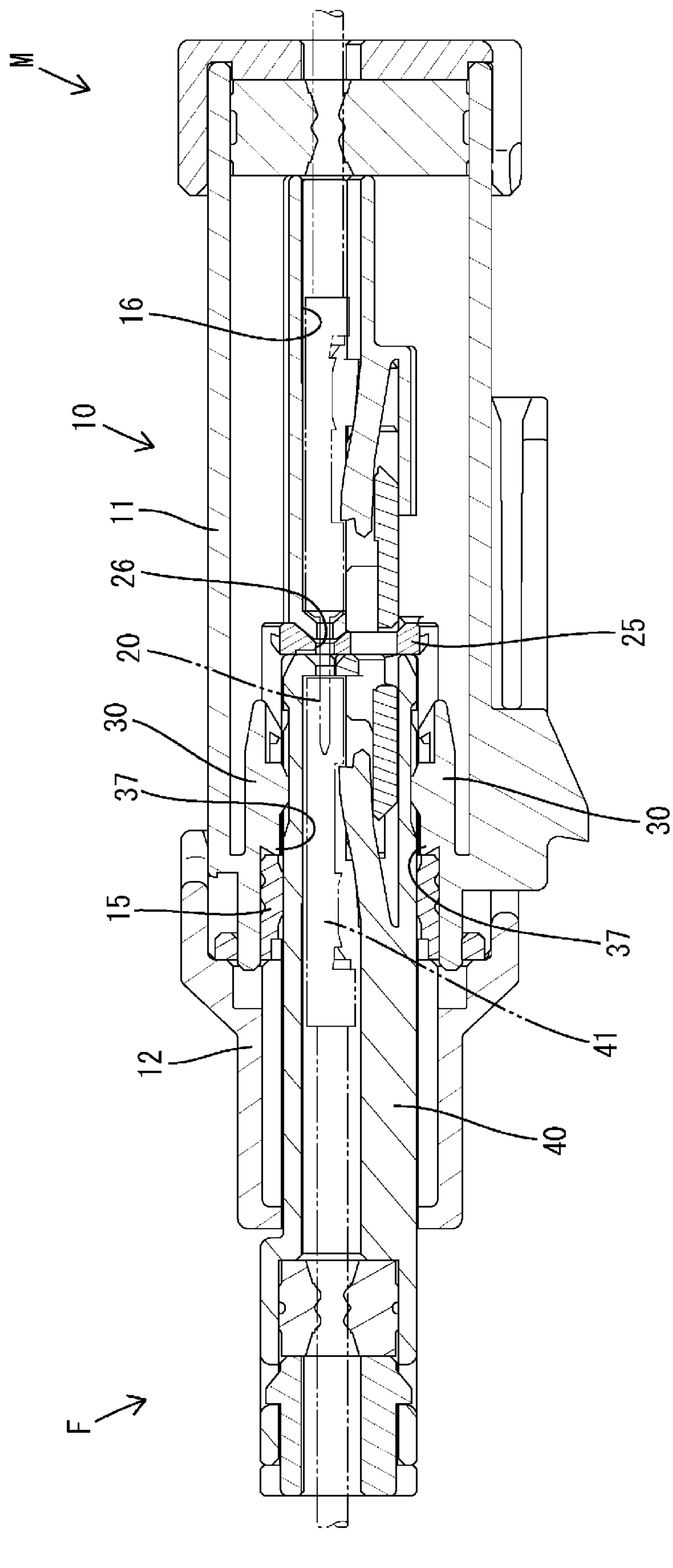
FIG. 5 is a side view in section showing a state where a connector housing and a mating housing are connected and the movable arm portions are resiliently returned.

As shown in FIG. 4, a locking projection 34 projecting toward an inner peripheral side (side opposite to the unlocking position of the displacing portion 32 in a displacement direction) from the inner surface of the displacing portion 32 is formed on an extending end part (rear end part) of the displacing portion 32. A bulging portion 35 projecting toward an inner surface side is formed on a part forward of the locking projection 34, out of the inner surface of the displacing portion 32. A thickness of the bulging portion 35 in the displacement direction (radial direction) of the displacing portion 32 is larger than that of a base end part (i.e. front end part near the fulcrum portion 31) of the displacing portion 32 and larger than that of a tip part (i.e. part formed with the locking projection 34) of the displacing portion 32. An interference portion 36 projecting further toward the inner surface side than a part on a front end side of the bulging portion 35 is formed in a region on a rear end side of the inner surface of the bulging portion 35.

A part of the bulging portion 35 forward of the interference portion 36 functions as a stopper 37. The stopper 37 projects toward the inner surface side (in a direction approaching the female terminal fitting 41) in a stepped manner with respect to the inner peripheral surface of the sealing portion 13. The stopper 37 is arranged only on the displacing portion 32, out of the movable arm portion 30. A front end 37F of the stopper 37 is located rearward of the front end of the displacing portion 32, i.e. rearward of the fulcrum portion 31. The stopper 37 and the fulcrum portion 31 are positioned to be spaced apart in an extending direction (i.e. front-rear direction) of the displacing portion 32.

The stopper 37 is arranged to face a rear end part of the sealing ring 15 in the front-rear direction. The front end surface (facing surface 38 facing the rear end surface of the sealing ring 15 in the front-rear direction) of the stopper 37 is inclined with respect to the front-rear direction (connecting direction of the male housing 10 and a mating housing). That is, the facing surface 38 is inclined to narrow a facing distance in the front-rear direction between the facing surface 38 and the rear end surface of the sealing ring 15 in a projecting direction of the stopper 37 (vertical direction in FIG. 4) from the inner surface of the displacing portion 32.

In a state where the rear end surface of the sealing ring 15 not resiliently deformed and a front end part of the stopper 37 without the movable arm portion 30 being resiliently deformed are in contact, a space S is secured between the inclined facing surface 38 of the stopper 37 and the rear end surface of the sealing ring 15. This space S is a space into which the wedge-shaped rear end part of the sealing ring 15 enters while being resiliently deformed when the sealing ring 15 is moved rearward.

When the movable arm portion 30 is in a free state without being resiliently deformed, a rear end 38R (part of the facing surface 38 connected at an acute angle to the inner surface of the displacing portion 32) of the facing surface 38 of the stopper 37 is located rearward (forward in the extending direction of the movable arm portion 30) of the fulcrum portion 31. Since the facing surface 38 of the stopper 37 is inclined with respect to the front-rear direction, the front end 37F (most distant part of the facing surface 38 from the inner surface of the displacing portion 32) of the stopper 37 is arranged at a position forward of the rear end 38R of the facing surface 38 of the stopper 37 and at the same position as the fulcrum portion 31 in the front-rear direction.

With the male connector M and the female connector F separated, the locking projections 34 of the movable arm portions 30 are locked to the projections 27 of the positioning member 25, whereby the positioning member 25 is held at the first position. The tabs 20 of the male terminal fittings 18 are positioned by being passed through the positioning holes 26. If the female connector F is connected to the male connector M in this state, the female housing 40 is inserted into the front member 12 and the connection proceeds while the female housing 40 slides in contact with the inner peripheral surface of the sealing ring 15. At this time, the sealing ring 15 is going to be relatively moved rearward (rightward in FIGS. 3 to 5) with respect to the male housing 10 by a pressing force from a front end part of the female housing 40 in the connecting direction and friction resistance between the outer peripheral surface of the female housing 40 and the sealing ring 15.

However, since the rear end part of the sealing ring 15 butts against the facing surfaces 38 of the stoppers 37, the sealing ring 15 is not positionally shifted rearward to a large extent. Further, if the sealing ring 15 is pushed rearward, the wedge-shaped rear end part of the sealing ring 15 bites into the space S secured between the facing surface 38 and the sealing ring 15 while being resiliently deformed. By this biting, a displacement of the rear end part of the sealing ring 15 toward the inner peripheral surface side is restricted. Therefore, the rear end part of the sealing ring 15 is not disengaged from the stopper 37 and a positional shift preventing function by the stopper 37 is reliably exhibited.

In a connection process of the female housing 40, a pair of upper and lower unlocking portions 42 formed on the front end part of the female housing 40 in the connecting direction interfere with the interference portions 36 of the movable arm portions 30. By this interference, the movable arm portions 30 are resiliently deformed and the displacing portions 32 are displaced from the locking position to the unlocking position. If the displacing portions 32 are displaced to the unlocking position, the locking projections 34 are disengaged from the projections 27, wherefore the positioning member 25 can be moved from the first position to the second position. After the displacing portions 32 are displaced to the unlocking position, the female housing 40 comes into contact with the front surface of the positioning member 25.

When the movable arm portion 30 is resiliently deformed, the displacing portion 32 is displaced to incline with the fulcrum portion 31 as a fulcrum. The bulging portion 35 formed with the stopper 37, out of the displacing portion 32, has a large thickness in the displacement direction of the displacing portion 32. A thickness of the fulcrum portion 31 of the movable arm portion 30 is smaller than that of the bulging portion 35. Accordingly, the rigidity of the fulcrum portion 31 is lower than that of a part formed with the stopper 37, out of the movable arm portion 30. In this way, connection resistance due to the interference of the interference portion 36 and the female housing 40 is suppressed low.

If the displacing portion 32 is displaced to the unlocking position, the displacing portion 32 is in an inclined posture. Thus, the facing surface 38 moves forward away from the rear end part of the sealing ring 15. Therefore, the stopper 37 does not bite into the rear end part of the sealing ring 15 according to a displacement of the displacing portion 32. Even if the displacing portion 32 is displaced to the unlocking position, the facing surface 38 is kept in a positional relationship to face the rear end surface of the sealing ring 15 in the front-rear direction from front. Therefore, even if the sealing ring 15 is positionally shifted rearward due to friction resistance with the female housing 40, the sealing ring 15 butts against the facing surface 38 to restrict any further forward displacement. In this way, the sealing ring 15 is kept in close contact with the inner peripheral surface of the sealing portion 13 without moving integrally with the female housing 40.

Further, since the unlocking portion 42 is in the form of a projection, the displacing portion 32 is returned from the unlocking position to the locking position by a resilient restoring force of the movable arm portion 30 if the unlocking portion 42 passes over the interference portion 36. By this return movement, the facing surface 38 approaches the rear end part of the sealing ring 15, wherefore the sealing ring 15 is kept in close contact with the inner peripheral surface of the sealing portion 13 without moving integrally with the female housing 40.

If the connection to the female connector F proceeds after the female housing 40 comes into contact with the front surface of the positioning member 25, the positioning member 25 is pushed integrally with the female housing 40. In association with this, parts of the tabs 20 passed through the positioning holes 26 move from the front end parts to the rear end parts of the tabs 20. When the female connector F and the male connector M reach a properly connected state, the male terminal fittings 18 and the female terminal fittings 41 are connected.

The connector of this embodiment includes the male housing 10 connectable to the female housing 40 and the sealing ring 15. The sealing ring 15 is mounted on the inner peripheral surface of the male housing 10 for sealing between the outer peripheral surface of the female housing 40 and the sealing ring 15. The male housing 10 is formed with the resiliently deformable movable arm portions 30. The movable arm portion 30 includes the fulcrum portion 31 and the displacing portion 32 extending rearward from the fulcrum portion 31 and displaceable toward the outer surface side in the direction intersecting the extending direction. The male housing 10 includes the stoppers 37 for restricting a rearward movement of the sealing ring 15. The stoppers 37 project from the displacing portions 32.

If a stopper projects from a fulcrum portion of a movable arm portion unlike this embodiment, the fulcrum portion becomes thick and the rigidity thereof is enhanced. Thus, it becomes difficult to deflect the movable arm portion. In contrast, since the stopper 37 of this embodiment is formed only on the displacing portion 32, out of the movable arm portion 30, the fulcrum portion 31 can be thinned and the rigidity of the fulcrum portion 31 can be suppressed low. In this way, it can be avoided to make the movable arm portion 30 difficult to deflect.

The stopper 37 is formed only in a region of the displacing portion 32 separated from the fulcrum portion 31. The stopper 37 is disposed at a distance from the fulcrum portion 31 in the extending direction of the displacing portion 32 (front-rear direction). In this way, an increase in the rigidity of the displacing portion 32 due to the formation of the stopper 37 is unlikely to affect the fulcrum portion 31.

The facing surface 38 of the stopper 37 facing the sealing ring 15 is inclined to approach the sealing ring 15 in the projecting direction of the stopper 37. According to this configuration, when the sealing ring 15 is pressed against the facing surface 38 of the stopper 37, the sealing ring 15 enters and bites into the space S defined by the displacing portion 32 and the facing surface 38. Since the sealing ring 15 is made difficult to separate from the peripheral surface of the male housing 10 in this way, sealing performance is excellent.

The displacement direction of the displacing portion 32 when the movable arm portion 30 is resiliently deformed from the free state where the movable arm portion 30 is not resiliently deformed is a direction to move the facing surface 38 forward away from the sealing ring 15. According to this configuration, the stopper 37 can be prevented from biting into the sealing ring 15 when the movable arm portion 30 is resiliently deformed.

The positioning member 25 movable between the first position for positioning the tip parts of the tabs 20 of the male terminal fittings 18 and the second position for positioning the base end parts of the tabs 20 is mounted in the male housing 10. The movable arm portions 30 can hold the positioning member 25 at the first position. In the process of connecting the female housing 40 to the male housing 10, the female housing 40 resiliently deforms and disengages the movable arm portions 30 from the positioning member 25. At this time, since the rigidity of the fulcrum portions 31 is lowered as described above, a connection force required to resiliently deform the movable arm portions 30 in the connection process of the female housing 40 can be reduced.

Other Embodiments

The present invention is not limited to the above described and illustrated embodiment and is represented by claims. The present invention is intended to include all changes in the scope of claims and in the meaning and scope of equivalents and also include the following embodiments.

Although the sealing ring is arranged on the inner peripheral surface of the connector housing and the movable arm portion is resiliently displaced toward the outer peripheral surface side of the connector housing in the connector of the above embodiment, the present invention can be also applied to a connector in which a sealing ring is arranged on an inner peripheral surface and a movable arm portion is resiliently displaced toward an inner peripheral side, a connector in which a sealing ring is arranged on an outer peripheral surface and a movable arm portion is resiliently displaced toward an inner peripheral side and a connector in which a sealing ring is arranged on an outer peripheral surface and a movable arm portion is resiliently displaced toward an outer peripheral side.

Although the stopper of the above embodiment prevents a movement of the sealing ring when the mating housing is connected, the stopper may prevent a movement of the sealing ring when the mating housing is separated.

Although the movable arm portion of the above embodiment is for holding the positioning member at the first position, the movable arm portion may be for locking the connector housing and the mating housing in the connected state.

Although the stopper is formed only in the region of the displacing portion separated forward from the fulcrum portion in the above embodiment, the stopper may be formed in a region of the displacing portion adjacent to the fulcrum portion.

Although the stopper and the fulcrum portion are arranged at a distance in the extending direction of the displacing portion (front-rear direction) in the above embodiment, the stopper and the fulcrum portion may be arranged at a distance in a direction intersecting the extending direction of the displacing portion.

Although the stopper projects in the displacement direction of the displacing portion in the above embodiment, the stopper may project in a direction intersecting both the extending direction of the displacing portion and the displacement direction of the displacing portion.

Although the facing surface of the stopper facing the sealing ring is inclined to approach the sealing ring in the projecting direction of the stopper in the above embodiment, the facing surface of the stopper facing the sealing ring may be a surface inclined away from the sealing ring in the projecting direction of the stopper or may be such a flat surface that a facing distance between the sealing ring and the facing surface does not change.

Although the displacing portion is displaced in the direction to move the stopper away from the sealing ring when the movable arm portion is resiliently deformed in the above embodiment, the displacing portion may be displaced in a direction to bring the stopper closer to the sealing ring when the movable arm portion is resiliently deformed.

LIST OF REFERENCE NUMERALS

F . . . female connector
M . . . male connector

S . . . space
10 . . . male housing (connector housing)
11 . . . housing body
12 . . . front member
13 . . . sealing portion
15 . . . sealing ring
16 . . . cavity
18 . . . male terminal fitting
19 . . . terminal body portion
20 . . . tab
21 . . . crimping portion
22 . . . wire
23 . . . one-piece rubber plug
25 . . . positioning member
26 . . . positioning hole
27 . . . projection
30 . . . movable arm portion
31 . . . fulcrum portion
32 . . . displacing portion
34 . . . locking projection
35 . . . bulging portion
36 . . . interference portion
37 . . . stopper
37F . . . front end
38 . . . facing surface
38R . . . rear end
40 . . . female housing (mating housing)
41 . . . female terminal fitting
42 . . . unlocking portion

What is claimed is:

1. A connector, comprising:

a connector housing connectable to a mating housing;

a sealing ring to be mounted on a peripheral surface of the connector housing for sealing between the peripheral surface of the connector housing and a peripheral surface of the mating housing;

a resiliently deformable movable arm portion formed on the connector housing; and a stopper for restricting a movement of the sealing ring, the movable arm portion including a fulcrum portion and a displacing portion extending from the fulcrum portion and displaceable in a direction intersecting an extending direction, and the stopper projecting from the displacing portion, wherein a facing surface of the stopper faces an extreme distal rear end surface of the sealing ring, the facing surface inclined with respect to the extending direction of the displacing portion to approach the sealing ring in a projecting direction of the stopper.

2. The connector of claim 1, wherein the stopper is formed only in a region of the displacing portion separated from the fulcrum portion.

3. The connector of claim 2, wherein the stopper is disposed at a distance from the fulcrum portion in the extending direction of the displacing portion.

4. The connector of claim 1, wherein a displacement direction of the displacing portion when the movable arm portion is resiliently deformed from a free state where the movable arm portion is not resiliently deformed is a direction to move the facing surface away from the sealing ring.

5. The connector of claim 1, further comprising a positioning member mounted in the connector housing, wherein:

the positioning member is movable between a first position for positioning a tip part of a tab of a male terminal fitting and a second position for positioning a base end part of the tab, the movable arm portion is capable of holding the positioning member at the first position, and the mating housing resiliently deforms and disengages the movable arm portion from the positioning member in a connection process of the mating housing.

* * * * *